March 15, 1938.  G. M. BELLANCA  2,111,274
WING STRUCTURE
Original Filed Feb. 9, 1933
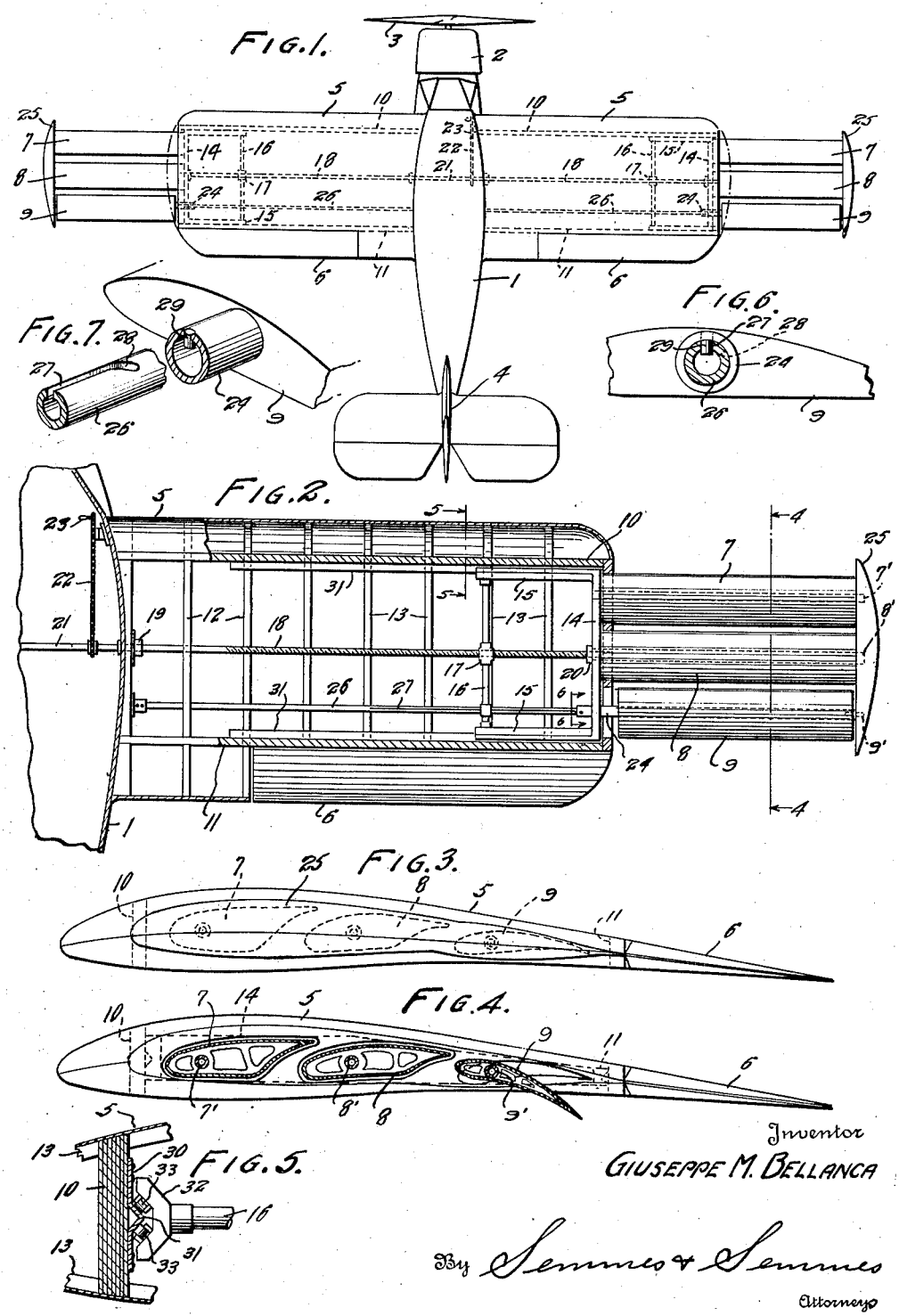
Inventor
GIUSEPPE M. BELLANCA
By Semmes & Semmes
Attorneys Patented Mar. 15, 1938

2,111,274

UNITED STATES PATENT OFFICE 2,111,274

WING STRUCTURE

Giuseppe M. Bellanca, Wilmington, Del.

Application February 9, 1933, Serial No. 656,002
Renewed August 3, 1937

1 Claim. (Cl. 244—42)

This invention relates to airplanes and more particularly to improved wing structure.

The desirability of providing a wing structure which at the one time has a low drag coefficient while the plane is in flight and has a high lift coefficient during takeoff and landing, has long been recognized. This is an important problem in transport planes wherein a high pay load is desired with a reasonable cruising speed. As the area of a wing is increased beyond certain values, for any given type of plane, the drag increases out of commercial proportion to the speed. However, in such transport planes a maximum lift is desirable at landing and takeoff.

An object of the present invention is, therefore, to provide a wing structure which provides for increased lift at landing and takeoff and which in cruising flight is of diminished drag.

Another object is to provide an airplane provided with main sustentation surfaces with which are associated auxiliary wings which may be extended from or retracted into the main wing at the option of the pilot.

A further object is to provide an improved airfoil structure with which are associated auxiliary wings, adapted to be nested within the main wing, and which are so associated as to occupy a large portion of the chord of the main wing.

With these and other equally important objects in view, the invention comprises the concept of providing auxiliary wings which may be nested in the main wing and extended therefrom, at the main wing tip, to provide additional lift surfaces. A salient feature of the invention is to so design the auxiliary wing surface that a relatively large number of wings may be associated with the main airfoil, and to retract these completely within the contour of the main wing if desired.

In order to enable a more ready comprehension a preferred embodiment is shown in the accompanying drawing, in which:

Figure 1 is a top plan view of an airplane.

Fig. 2 is an enlarged top sectional view of a main wing.

Fig. 3 is a side elevation of the main wing with the auxiliary wings retracted.

Fig. 4 is a cross section taken on line 4—4 of Fig. 2.

Fig. 5 is an enlarged cross sectional detail taken on line 5—5 of Fig. 2.

Fig. 6 is an enlarged cross section on line 6—6 of Fig. 2.

Fig. 7 is an enlarged detail of a portion of the auxiliary wing operating means.

As shown in the accompanying drawing, the invention may be embodied in an airplane which includes a fuselage 1, a power plant 2, tractor propeller 3, and an empennage 4. The airplane may be of the monoplane or biplane type, a monoplane being shown for the purposes of explanation. The airplane is provided with the main wing sections 5, extending laterally from the fuselage and suitably attached to it. These main wings may be additionally braced in any desired manner. Such wings are provided with ailerons 6 of any desired type of construction.

In the preferred embodiment the main wing 5 is so designed with respect to the fuselage as to give the optimum cruising speed with the minimum drag or wind resistance. In such a construction improved cruising characteristics are thus available without diminishing from the cruising efficiency. However, the benefits of increased lift to attain low landing and takeoff speeds may be embodied in the wing structure.

As shown in Fig. 2, additional lift may be imparted to the wing by providing the auxiliary or supplemental wings 7, 8 and 9. These wings are adapted to be in extended form or retracted within the contour of the main wing. The main wing is provided with suitable structural members, such as leading spar 10 and trailing spar 11. Ribs 12, of any desired type, may be employed. Near the outer end of the wing, special ribs 13 are utilized. These ribs are specially constructed in the sense that they are so formed as to permit the reception of the auxiliary wings 7, 8, and 9. Since these auxiliary wings are initially spaced from each other, the ribs 13, by proper positioning of the interbracing members, may be made with sufficient structural strength and rigidity. As shown in Fig. 2, the auxiliary wings 7, 8, and 9 are mounted upon an interior frame member which may comprise the cross bar or strut 14 and the longitudinal members 15 rigidly secured to the cross bar. A strut 16 interconnects the inner ends of the longitudinal members 15. If desired, supplemental rigidifying, compression or tension elements may be employed in the frame work to increase its strength and rigidity. The cross bar 16 is provided with a nut member 17 which is internally tapped or threaded to receive the driving or operating screw 18. As shown, this screw is mounted at its inner end adjacent the fuselage in the bushing or journal 19, and at its other end is rotatably mounted in the bushing or journal 20, fixed to the frame member 14. The driving screw 18 has an internal extension 21 connected to a suitable transmission 22 to a motor element 23. By applying motive power to the element 23 the screw 18 may be rotated. Due to the threading engagement with the nut 17, such rotation effects longitudinal movement of the frame work, and the auxiliary wings, inwardly and outwardly of the main wing.

In the ordinary wing construction, as is known, the thickest portion of the wing, that is to say the high camber section, is positioned about one-third the distance from the leading edge. The remainder of the wing tapers back rather flatly to the tip of the aileron. In such circumstances definite limits are placed on the auxiliary wings employed with the main wing and on the angle of attack of these wings. If auxiliary wings are to be employed having a relatively high angle of attack, and these are to be of any appreciable size, the trailing section of the wing, due to its thinness, is not ordinarily available as a housing member.

According to the present invention airplane construction is considerably improved, and particularly in respect of increasing the lift of the wing, especially at relatively large angles of attack. This may be accomplished by providing special auxiliary slotted wing sections, together with special operating means whereby the angle of incidence of any desired number of the auxiliary wings may be varied. In one modification selected for the purpose of illustrating this concept the last or trailing wing of the auxiliary wing section is shown as rotatable so as to vary its angle of incidence. In this manner the trailing auxiliary wing, and/or other wings of the auxiliary wing group, may be simultaneously or separately rotated, during extension from the main wing, so as to give an increased angle of incidence to the units in the auxiliary wing group. Since the forwardly positioned auxiliary wings are housed within the thicker portion of the main wing they may initially be given any desired angle of incidence substantially different from that of the main wing. According to the present invention certain of the wings of a series of auxiliary wings, and especially those positioned at and near the trailing edge, are associated with special means whereby they may be given any desired equal or differential angle of incidence after extension from the main wing. It will be appreciated also that, if desired, after extension each of the auxiliary wing sections may be rotated as a unit and furthermore by the employment of rather simple mechanism the sections may be rotated to a differential degree, so as to vary the angle of incidence of the auxiliary wing unit as a whole. It will be understood that the incidence relationship of the separate wing sections constituting the auxiliary wing unit will be so relatively positioned and individually constructed as to obtain the maximum lift effect from the unit, particularly at high angles of attack.

With this concept in view a number of specific devices may be utilized to accomplish the stated function. A simple and typical embodiment is shown in the accompanying drawing. As shown in Figs. 2, 3, and 4, a group of auxiliary wings 7, 8, and 9 are provided in which the wings 7 and 8 are substantially rigidly secured to the cross member 14 with a fixed angle of incidence. Since these wing members operate in the foreward portion of the wing, they may readily be housed within the main wing, as shown in Fig. 3, even in spite of the relatively high angle of incidence. The trailing wing 9 is, however, rotatably mounted on the member 14 by means of the journal section 24. Special operating means are provided whereby this trailing wing section 9 is automatically rotated in one direction so as to diminish its angle of incidence, and thereby allow its reception within the thin portion of the main wing section, and is automatically rotated, after the wing unit is extended into its operative position, so as to increase its angle of attack conformably to that of the wing sections 7 and 8. In the preferred form of construction these wings may be maintained in operative position and the whole wing rigidified by providing a wing tip guide 25. This wing tip guide is suitably conformed so as to give the desired contour to the main wing tip 5 when the auxiliary wing unit is in inoperative position. The auxiliary wings 7, 8, and 9 may be attached to the wing tip member 25 by providing the bushing extensions 7', 8', and 9'. The extensions 7' and 8' may be securely locked to the wing tip member 15, while extension 9' is rotatably mounted in such member.

In order to effect this automatic rotation or change in the angle of incidence of the wing section 9, a special automatic mechanism is employed. This may comprise a tubular member 26 rigidly and non-rotatably mounted, at the wing root, in the bushing 27. At the outer end this slot is curved, as shown at 28. The length or extent of the curved extension 28, as will be appreciated, will be governed by the angle of attack which is desired to be given the auxiliary wing 9. The shaft section 24, which is rigidly attached to the trailing auxiliary wing 9 is of hollow tubular construction and is adapted to fit over the tubular member 26. It is provided with a pin 29 which fits and operates within the slot 27. It will be understood that the shaft section 27 may be provided with suitable flanges whereby it is maintained in fixed longitudinal position with respect to the cross piece 14.

In order to increase the ease with which the auxiliary wing unit may be extended or retracted, an anti-friction mount is provided between the main support members 10 and 11 and the movable carriage. Such a type of support is shown in detail in Fig. 5. Each of the inner surfaces of the leading and trailing spar may be provided with a plate 30 upon which is formed the angular track portion 31. The cross bar 16 is provided with a clevis or bifurcated end 32, on which are mounted the antifriction rollers 33. This type of construction not only provides rolling friction between the carriage and the leading and trailing spars but, due to its special construction, also insures against vertical displacement of the carriage with respect to the structural members in the main wing.

When the device is assembled the hollow tubular member 24 on the auxiliary wing section 9 encloses the tubular member 26 (as shown in Fig. 6). In these circumstances the pin 29 operates within the slots 28. In normal circumstances the auxiliary wing unit is nested within the main wing and the wing tip brace 15 constitutes a stream-line continuation of the tip of the main wing. In such circumstances the individual auxiliary wings of the auxiliary wing section are positioned as shown in Fig. 3, that is to say the sections 7 and 8 are housed within the main wing at a high angle of attack, whereas the auxiliary wing 9 is housed within the trailing section of the main wing at a very low angle of incidence. When it is desired to increase the lift of the wing, as for example at takeoff or landing, the shaft 18 is rotated. Due to the threaded engagement with the nut 17 of the extensible carriage, such rotation effects outward movement of the entire carriage and causes the extension of the unit beyond the confines of the main wing. In the early part of this movement, the pin 29 operates in the straight portion of the slot 27. However, as the wing 9 approaches its main extended position, the pin 29 is constrained to rotate in the tube 26 by reason of its engagement with the curved terminal portion of the slot 28. Such rotation is imparted to the auxiliary wing 9 and increases its angle of attack up to the predetermined fixed value. When the wing unit is retracted it is drawn inwardly by the rotating screw 18. During the initial portion of this movement the pin 27, included in the curved portion of the slot, causes reversed rotation of the trailing wing 9 until it is depressed to its lowermost angle of incidence.

It will be seen that the present invention insures improved results by utilizing an extension mechanism which automatically rotates the trailing auxiliary wing, and/or other wings of the auxiliary wing group. A greater chord of the auxiliary unit as a whole is made possible and at the same time very effective high angle of incidence is insured to each of the wings constituting the auxiliary wing units.

The present application is a continuation in part of my prior application Serial No. 586,010. In conformity with the disclosure in the earlier application, the auxiliary wing unit of the present invention may be made automatically operable by the operating devices disclosed therein.

It will be appreciated that with the construction of the present invention a very decided increase in lift may be secured. By providing a slotted wing section, the rearward edge of which may be depressed or given a decidedly increased angle of incidence, a high lift is imparted especially at great angles of attack. As pointed out, this increase in lift may be secured by rotating either the trailing wing section 9 or any number of the wing sections 7, 8, and 9, either simultaneously or separately and by giving either the same or a differential increase in angle of incidence to the several wings.

Therefore, while a preferred embodiment of the invention has been described, it is to be understood that this is typical of any equivalent structure which will insure the same improved results. The invention, therefore, is not intended to be limited to the specific embodiments shown, except as such limitations are clearly imposed by the appended claim.

I claim:

In an airplane having a fuselage and a main wing on each side of the fuselage, a plurality of auxiliary wings mounted in a framework, means connected with the framework to move said framework and the auxiliary wings longitudinally of the main wing, means to prevent rotation of the framework about the longitudinal axis of the wing and means connected with the said trailing auxiliary wing automatically to rotate it to increase its angle of incidence only when said trailing auxiliary wing has reached substantially its fully extended position.

GIUSEPPE M. BELLANCA.